(12) United States Patent
Johnson et al.

(10) Patent No.: US 11,941,592 B2
(45) Date of Patent: *Mar. 26, 2024

(54) SYSTEM AND METHOD FOR PROCESSING A VIRTUAL MONEY ORDER

(71) Applicant: Capital One Services, LLC, McLean, VA (US)

(72) Inventors: Kyle Johnson, Falls Church, VA (US); Salik Shah, Washington, DC (US); Robert Perry, Ashburn, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/671,051

(22) Filed: Feb. 14, 2022

(65) Prior Publication Data

US 2022/0172186 A1 Jun. 2, 2022

Related U.S. Application Data

(63) Continuation of application No. 16/829,544, filed on Mar. 25, 2020, now Pat. No. 11,282,046.

(51) Int. Cl.
*G06Q 20/10* (2012.01)
(52) U.S. Cl.
CPC .................................. *G06Q 20/10* (2013.01)
(58) Field of Classification Search
CPC ............... G06Q 20/10; G06Q 20/3278; G06Q 20/3829; G06Q 20/40145
(Continued)

(56) References Cited

U.S. PATENT DOCUMENTS

| 5,671,280 A | 9/1997 | Rosen |
| 6,332,134 B1 | 12/2001 | Foster |

(Continued)

FOREIGN PATENT DOCUMENTS

| AU | 777762 B2 | 10/2004 |
| CA | 2267314 A1 | 4/1998 |

(Continued)

OTHER PUBLICATIONS

Kelly, Archie B., "The future of the check: how Check 21 and emerging technologies will change our payments system". Government Finance Review10.4: 29(6), Government Finance Offices Association, (Year: Aug. 2004).*

(Continued)

*Primary Examiner* — Frantzy Poinvil
(74) *Attorney, Agent, or Firm* — HUNTON ANDREWS KURTH LLP (57) ABSTRACT

A method of processing a virtual money order transaction includes establishing an account for a first user having a first user device and receiving from a second user device, a virtual money order purchase request identifying the first user as a payee, an amount, and payment information. A transfer of a payment amount from a second user account to a transaction processor account is processed and a virtual money order is generated with associated information accessible at a network address. A notification including the network address is transmitted to the first user device and a request to receive the money order information is received via the network address. Responsive to verification that the requester is authorized, the information is transmitted to the first user device. A redemption request is received and a transfer of the money order amount from the transaction data account to the redemption requester is processed.

20 Claims, 3 Drawing Sheets

(58) Field of Classification Search
USPC .................................................. 705/3–44
See application file for complete search history.

(56) References Cited

U.S. PATENT DOCUMENTS

| | | | |
|---|---|---|---|
| 6,895,394 B1 | 5/2005 | Kremer et al. | |
| 7,433,845 B1 | 10/2008 | Flitcroft et al. | |
| 7,890,393 B2 | 2/2011 | Talbert et al. | |
| 8,688,579 B1* | 4/2014 | Ethington | G06V 10/44 |
| | | | 705/42 |
| 8,732,078 B1 | 5/2014 | Billman et al. | |
| 8,996,476 B2 | 3/2015 | Williams et al. | |
| 9,595,028 B2 | 3/2017 | Davis et al. | |
| 9,779,392 B1* | 10/2017 | Prasad | G06Q 20/10 |
| 9,852,406 B2 | 12/2017 | Doyle et al. | |
| 11,756,009 B1* | 9/2023 | Prasad | G06Q 20/0425 |
| | | | 705/39 |
| 2002/0120563 A1 | 8/2002 | McWilliam et al. | |
| 2004/0210448 A1 | 10/2004 | Breck et al. | |
| 2005/0234817 A1 | 10/2005 | VanFleet et al. | |
| 2006/0041517 A1 | 2/2006 | Liao | |
| 2006/0116960 A1 | 6/2006 | Gillin et al. | |
| 2006/0136317 A1 | 6/2006 | Mizrah | |
| 2006/0143119 A1 | 6/2006 | Krueger et al. | |
| 2006/0206403 A1 | 9/2006 | Gill et al. | |
| 2007/0143209 A1 | 6/2007 | German et al. | |
| 2008/0249931 A1* | 10/2008 | Gilder | G06Q 20/04 |
| | | | 705/39 |
| 2010/0010916 A1 | 1/2010 | Hutchison et al. | |
| 2010/0205091 A1 | 8/2010 | Graziano et al. | |
| 2011/0029409 A1 | 2/2011 | Ganz et al. | |
| 2013/0144734 A1 | 6/2013 | Perkins et al. | |
| 2013/0166453 A1 | 6/2013 | Regep, II | |
| 2013/0218716 A1 | 8/2013 | Godsey et al. | |
| 2014/0067661 A1* | 3/2014 | Elischer | G06Q 20/042 |
| | | | 705/39 |
| 2014/0081866 A1 | 3/2014 | Hogl et al. | |
| 2014/0250001 A1 | 9/2014 | Isaacson et al. | |
| 2015/0371212 A1 | 12/2015 | Giordano et al. | |
| 2016/0012465 A1* | 1/2016 | Sharp | G06Q 20/321 |
| | | | 705/14.17 |
| 2016/0328711 A1 | 11/2016 | Elischer | |
| 2017/0132633 A1* | 5/2017 | Whitehouse | H04L 63/08 |
| 2018/0147495 A1 | 5/2018 | Bowman et al. | |
| 2018/0330342 A1 | 11/2018 | Prakash et al. | |

FOREIGN PATENT DOCUMENTS

| | | |
|---|---|---|
| CA | 2357201 A1 | 3/2002 |
| EP | 0944882 A1 | 9/1999 |
| EP | 1886285 A1 | 2/2008 |
| EP | 2624190 A1 | 8/2013 |
| GB | 2352861 A | 2/2001 |
| NL | 1041024 B1 | 10/2016 |
| WO | 2002011028 A1 | 2/2002 |
| WO | 2002075679 A2 | 9/2002 |
| WO | 2003042893 A1 | 5/2003 |
| WO | 2010003429 A1 | 1/2010 |

OTHER PUBLICATIONS

Translated by Content Engine LLC. "The decline of the paper cheque: replaced by the e-cheq, its use declined during the pandemic ", CE Noticias Financieras, English, ed. Miami, (Year: Oct. 31, 2021).*

Panurach, Patiwa, "Money in electronic commerce: digital case, electronic fund transfer, and Ecash", Communicatins of the ACM 39.n6: p. 45(6). Association for Computing Machineryt, Inc. (Year: Jun. 1996).

* cited by examiner

SYSTEM AND METHOD FOR PROCESSING A VIRTUAL MONEY ORDER

CROSS REFERENCE TO RELATED APPLICATION

This application is a continuation of U.S. application Ser. No. 16/829,544, filed Mar. 25, 2020, the complete disclosure of which is incorporated herein by reference.

FIELD OF THE INVENTION

This disclosure relates generally to systems for automated processing of financial transactions and, more particularly, to a system and method for processing money transfers between account holders.

BACKGROUND OF THE INVENTION

Individuals often have a need or desire for quick transfers to make cash available to other individuals or to other entities that lack their own financial transaction processing systems. Typical monetary transfers between individuals involve the physical transfer of cash or a bank order in the form of a personal check, cashier's check or money order. Where physical transfer is infeasible or too slow, wire transfers and account-to-account payment services may be used. Such services may be quicker in some cases, but they raise significant concerns in relation to account security and fraud potential.

The various mechanisms for conducting money transfers between individuals have varying degrees of speed, typically inversely proportional to their levels of safety and security. What is needed is a transfer mechanism that is quick, safe, and secure.

SUMMARY OF THE INVENTION

An illustrative aspect of the invention provides an automated method of processing a virtual money order transaction between a first user having a first user device and a second user having a second user device. The method comprises establishing, by an account registration data processor, a first money order account for the first user and receiving, by a money order transaction data processor from the second user device, a virtual money order purchase request. The request includes identification of the first user as a virtual money order payee, a money order amount, and second user payment information. The method further comprises processing, by the money order transaction data processor using the second user payment information, a payment transaction to transfer a payment amount from an account of the second user to a transaction processor account. The payment amount is equal to or greater than the money order amount. The method still further comprises generating, by the money order transaction data processor, a virtual money order having associated virtual money order information accessible over a network via a network address. The method also comprises transmitting, to the first user device, a money order notification including the network address and receiving, by the money order transaction data processor from the first user device via the network address, a request to receive the virtual money order information. The request includes first user authorization information, which is used by an authorization data processor to verify that the first user is authorized to receive the virtual money order information. Responsive to a positive verification that the first user is authorized to receive the virtual money order information, the virtual money order information is transmitted to the first user device. The method also comprises receiving, by a money order redemption data processor, a request from a redemption requester to redeem the virtual money order. The request includes at least a portion of the money order information. The method further comprises processing, by the money order redemption data processor, a transfer of the money order amount from the transaction data account to the redemption requester.

Another aspect of the invention provides an automated virtual money order processing system comprising an account registration data processor, a money order transaction data processor, an authorization data processor, and a money order redemption data processor. The account registration data processor is configured to establish a first money order account for the first user. The money order transaction data processor is configured to receive, from a second user device via a first network, a virtual money order purchase request of a second user, the purchase request including identification of the first user as a virtual money order payee, a money order amount, and second user payment information. The money order transaction data processor is further configured to process, using the second user payment information, a payment transaction to transfer a payment amount from an account of the second user to a transaction processor account. The payment amount is equal to or greater than the money order amount. The money order transaction data processor is still further configured to generate a virtual money order having associated virtual money order information accessible via a network address on a second network, which may be the same as the first network. The money order transaction data processor is also configured to transmit, to the first user device via the first network, a money order notification including the network address and to receive from the first user device via the network address, a request to receive the virtual money order information. The request includes first user authorization information. The authorization data processor is configured to receive the authorization information from the money order transaction data processor and verify, using the authorization information, that the first user is authorized to receive the virtual money order information. Responsive to a positive verification that the first user is authorized to receive the virtual money order information, the authorization data processor transmits the virtual money order information to the first user device via the second network. The money order redemption data processor is configured to receive a request to redeem the virtual money order. The request includes at least a portion of the money order information. The money order redemption data processor is also configured to process a transfer of the money order amount from the transaction processor account to the redemption requester.

Another aspect of the invention provides a virtual money order transaction system comprising a plurality of user interface devices, each user interface device being associated with a user and being configured for communication over a network. The virtual money order transaction system further comprises a virtual money order data processing system, and a transaction processor of a financial institution. The virtual money order data processing system is in communication with the network and includes an account registration data processor, a money order transaction data processor, an authorization data processor, and a money order redemption data processor. The account registration data processor is configured to establish a first money order account for a first user having an associated first one of the user interface devices. The money order transaction data processor is configured to receive, from a second one of the user interface devices via the network, a virtual money order purchase request. The purchase request includes identification of the first user as a virtual money order payee, a money order amount, and second user payment information. The money order transaction data processor is further configured to generate a virtual money order accessible via a network address on the network. The virtual money order includes unique redemption indicia. The money order transaction data processor is still further configured to transmit, to the first user device via the first network, a money order notification including the network address, and receive from the first user device via the network address, a request to view the virtual money order. The request includes first user authorization information. Responsive to a positive verification that the first user device is authorized to receive the virtual money order information, the money order transaction data processor allows access to the virtual money order by the first user device. The authorization data processor is configured to verify, using the authorization information, that the first user device is authorized to access the virtual money order. The money order redemption data processor is configured to receive a request to redeem the virtual money order. The request includes purported redemption indicia. Responsive to a determination that the purported redemption indicia matches the unique redemption indicia of the virtual money order, the money order redemption data processor transmits an instruction to redeem the virtual money order. The transaction processor is in communication with the network and is configured to receive, from the first user device, the request to redeem the virtual money order, to transmit to the money order redemption data processor the request to redeem the virtual money order, and responsive to receiving the instruction to redeem the virtual money order from the order redemption data processor, transfer cash in the virtual money order amount to the first user.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

Embodiments of the present invention provide secure methods by which an individual may transfer money with immediate availability to another individual or other entity. This is accomplished through the use of a transfer mechanism referred to herein as a virtual money order. In the methods of the invention, a virtual money order may be purchased by a first system user from a trusted third party system manager or processor. The first system user (the "purchaser") identifies a second system user to whom the virtual money order will be made payable. The third party system manager makes the virtual money order available to the second system user (the "receiver" or "payee") at a specified network address. The receiver reaches out to the specified network address and provides authentication information to the third party system manager. Upon verifying the identity of the receiver, the system manager provides the receiver with unique information associated with the virtual money order. In particular embodiments, this information may be or include unique graphical indicia such as a quick response (QR) code. The receiver may then obtain cash or have the amount of the virtual money order deposited into an account simply by providing the unique information at an ATM or live teller station of a participating financial institution. The financial institution, in turn, provides the information to the third party system manager who transfers the amount of the money order to the financial institution.

The virtual money order approach provides a way for the receiver to get immediate money access with no physical transfer required and no waiting for bank processing or clearance. Further, while the basic approach provides an inherently secure methodology, it also lends itself to extensions that provide additional levels of security.

Figure 1:
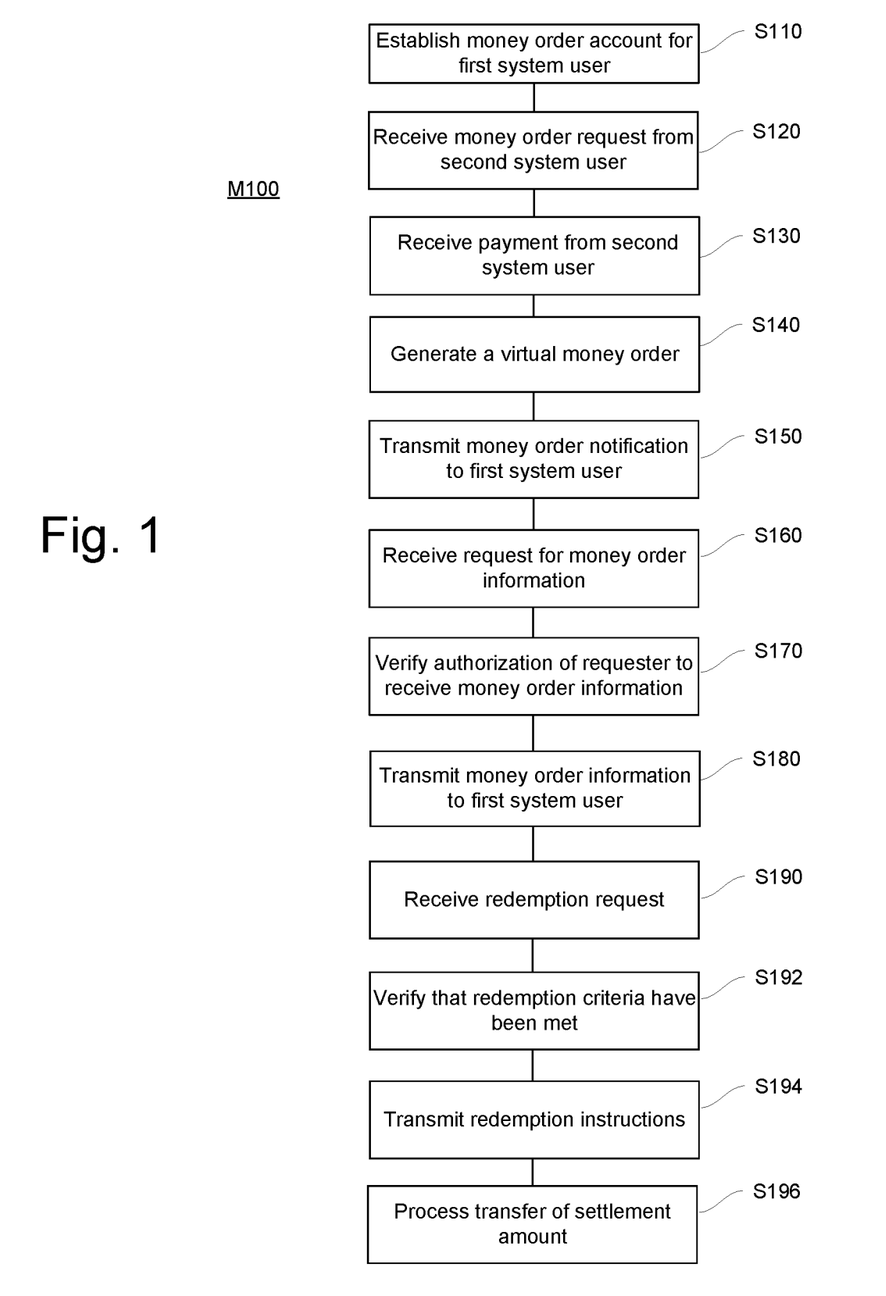
FIG. 1 is a flow chart of actions in a method for processing a virtual money order according to an embodiment of the invention.

Embodiments of the invention will now be described in more detail. FIG. 1 illustrates an automated method M100 of processing a virtual money order transaction according to an embodiment of the invention. The method M100 may be carried out using a data processing system of a financial entity that acts as a trusted third party to facilitate transfers between first and second system users. At S110, the processing system establishes a money order account for the first system user. In some embodiments, this may be done in response to receiving an account request from the first user via a user device (e.g., a mobile device or computer) over a network. As part of the action to establish the money order account, the system may request registration information that may later be used for identification and authentication purposes. The system may also assign an account identifier and associate a public key and a private key with the account identifier and the first user information. In some embodiments, the public and private key may be or be associated with login information that is generated by the user, the system or a combination of the user and the system. The system may store all account and identification information associated with the first user in a money order account database. As will be discussed in more detail below, the system may also establish user preferences and/or security levels with the account. In some embodiments, the first user may be provided with a money order account application for installation on one or more of the user's devices. Information on each such device may be retained by the system for future authentication.

At S120, the trusted third party processing system receives a money order request from a second user. This request may be received over a network from a user device of the second user. Alternatively, the request may be received at a physical location associated with the trusted third party (e.g., a brick and mortar outlet or automated kiosk). In such embodiments, the request may be processed and transmitted to a central processor by a local processor.

In particular embodiments, the request may be formulated and transmitted by an application on the user device.

In some embodiments, the second user may hold a money order account or other account with the trusted third party. In such embodiments, the request may include information associated with the second user's money order account. Such information could include, for example, the second user's public and private keys.

The money order request may include identification of the first user as a payee for the virtual money order and an amount to be paid to the first user (sometimes referred to herein as the money order "value". In some embodiments, the request may include information associated with the first user's money order account. This could include for example the first user's name, user name, account number, or public key. The request may also include payment information for the second user. This may include account information for an account from which money is to be transferred. In some embodiments, the payment information may include information from a transaction card associated with an account of the second user. The payment account information may include additional information usable by the trusted third party for authentication of the third party's right to payment from the second user's payment account.

It will be understood that in embodiments where the request is submitted by the second user at a physical location of the trusted third party, the second user may proffer a cash payment to the trusted third party. In such cases, the payment information may simply indicate that a cash payment has been received.

In some embodiments, the money order request may specify preferences or conditions set forth by the second user. As will be discussed, permission to specify certain conditions may depend on a particular status of the second user as an account holder with the trusted third party. In embodiments, where conditions may be specified, the second user may, if authorized to do so, may specify particular authentication steps that must be taken before the virtual money order may be redeemed. For example, the second user may specify that certain additional information must be provided by the first user. In some embodiments, the second user may be allowed to require a final redemption authorization by the second user at the time of redemption of the virtual money order. In some cases, the second user may specify other conditions that must be fulfilled before the virtual money order may be redeemed. For example, the second user may require that a certain period of time must pass or that certain events must occur. Conversely, the second user may be allowed to specify that if the virtual money order is not redeemed within a certain period of time or that if other particular events occur, the virtual money order is to be rescinded or canceled.

At S130, the trusted third party processing system receives a payment amount from the second user. This may simply involve receiving cash from the second user as in the in-person transaction described above. In various embodiments, however, this may be accomplished by using the second user payment information to identify the second user's payment account and processes a transfer of the payment amount from the payment account to a transaction processor account of the trusted third party. The payment amount may be equal to the money order value. In typical embodiments, however, the payment amount may be greater than the money order value, with the difference representing a fee or fees associated with the transaction.

At S140, the trusted third party processing system generates a virtual money order in the form of a record comprising money order information relating to the transaction. Money order information may include the money order value and identification of the first user as the money order payee. This record may be stored in a money order transaction database or in the money order account database, in either case, in association with the first user money order account. At S150, the system may transmit a money order notification. This notification may be transmitted by the system directly to one or more user devices associated with the first user (e.g., by SMS or other text method, email, etc.). Alternatively, the notification may be transmitted to one or more user devices of the second user to allow the second user to relay the notification or otherwise transmit some or all of its content to the first user. In either case, the money order notification may include a network address to which the first user may navigate (e.g., using a web browser or via the money order application) to view, and/or obtain redemption information for, the virtual money order. Additional information in the money order notification could include the money order value, identification authentication requirements, and any time limitations or other conditions. In some embodiments, inclusion of any or all these in the money order notification may be specified by the second user at the time of the money order request.

At S160, the trusted third party processing system receives from the first user a request to view and/or otherwise receive money order information for the virtual money order. This request may be received from a first user device via the network address provided in the money order notification. In some embodiments, the request may be or include an interactive session between the first user device and the trusted third party processing system. The request may include user authentication information that the processing system can use to verify that the request is from the first user. Such authentication information may include the public and private keys or other authentication information associated with the first user's money order account. Additional authentication information could include information uniquely associated with the virtual money order and provided to the first user in the money order notification.

At S170, the trusted third party processing system uses the authentication information to verify identity and/or authorization of the requester to receive or view information from the virtual money order record. In some embodiments, an additional action may be taken to transmit an authorization confirmation request to the second user and to receive a confirmation response from the second user. Upon positive verification of identity and/or authorization of the requester (and, if applicable, a positive confirmation response from the second user), virtual money order information is retrieved from data storage and transmitted to the requesting user device of the first user at S180. This may include unique information associated with the virtual money order that will be required for the first user to redeem the virtual money order. The unique information may, in particular, be or include unique graphical indicia such as a quick response (QR) code that can be displayed on a mobile user device of the first user. The unique information may be generated by the processing system and stored in the money order data storage record. This may be done at the time the record is created or upon receiving the request for money order information.

At S190, the trusted third party processing system receives a request for redemption of the virtual money order. This request will typically be received from a transaction processing machine of a financial institution or other entity to which the first user has presented the virtual money order for redemption. The third party processing system may then verify that all redemption criteria have been met at S192. This may include verification that the redemption request includes a required portion (or all) of the unique information associated with the virtual money order that was previously provided to the first user. In embodiments where the unique information is or includes unique graphical indicia, the request may need to include a scan of this indicia obtained by the transaction processing machine. Verification may be accomplished by comparing the indicia or other unique information to information pulled from the stored virtual money order record. Positive verification may also require inclusion of additional user authentication information in the redemption request. This could include, for example, a scan of one or more biometric parameters by the transaction processing machine. Alternatively or in addition, the presence of a smart card or particular mobile device may be required. Such presence may be established via wireless communication between the card or device and the transaction processing machine. Positive verification may also require verification that additional conditions established by the money order requester have been met. This could include, for example, verification that the date and/or time of the redemption request fall within date and time restrictions set by the requester or that other event conditions have been met.

Upon positive verification of the money order redemption request, the trusted third party processing system may transmit an instruction to the transaction processing machine to complete the redemption transaction for the virtual money order at S194. Depending on the embodiment and/or the desires of the redemption requester, this may be accomplished by dispensing to the requester an amount of cash equal to the value of the money order. Alternatively, it could be accomplished by depositing the money order value into an account of the first user, such value being immediately available for cash withdrawal or transfer by the first user.

At S196, the trusted third party processing system processes a transfer of a settlement amount from the transaction processor account to the financial institution or other entity that redeemed the virtual money order. In some embodiments, the settlement amount may be equal to the money order value. In other embodiments, the settlement amount may be greater than the money order value, with the difference representing a fee or fees related to the redemption transaction.

As noted above, certain embodiments provide for money order account holders to be afforded procedural preferences or optional features in relation to virtual money order transactions. In some cases, these may be selected at the time the virtual money order account is established. For example, the account holder may request that secondary authentication measures be required by the trusted third party processing system before a requester purporting to be the account holder is allowed to view or receive the money order information after logging on to the network address provided in the money order notification. This would reduce the risk of fraudulent redemption of a virtual money order intended for the account holder. The account holder might similarly be request that similar measures be taken to require additional authentication by the payee of a virtual money order purchased by the account holder. Other optional security preferences could include requirement of payee identity verification at the time of redemption or a final authorization verification as previously described.

The methods of the present invention provide an additional degree of confidence in relation to the avoidance of fraud in person-to-person transfers, particularly in cases where the requester intends to use the virtual money order as payment for a good or service. Because the intended payee is an account holder with the trusted third party, it may be less likely that the payee is an untrackable entity that will not hold up its end of the transaction. The risks associated with such transfers may further decrease as additional security options are applied. Accordingly, the trusted third party processor of the virtual money order transaction may offer insurance options to its account holders with varying insured value levels depending on the options selected. Such value levels may be further increased when both the money order requester and the payee are account holders or when the payee holds at least a certain amount in an account with the trusted third party. In certain scenarios, the ability to insure a transaction could be used as an inducement for the virtual money order requester to establish an account with the trusted third party, which would decrease the likelihood of a fraudulent transaction. In any circumstance, the trusted third party could offer insurance for a fee to the money order requester.

As noted above, some embodiments may provide for the virtual money order requester to specify conditions that must be fulfilled prior to redemption. Authorization to specify such conditions may be limited to requesters having a money order account and/or having one or more other accounts with the trusted third party. In these embodiments, the trusted third party processing system may receive with the money order request one or more redemption conditions. In particular embodiments, the system may provide condition options to the requester as part of an interactive session between the system and the requester's user device. Condition options could include time-related conditions such as a requirement that the virtual money order cannot be redeemed before a certain date or time or that the virtual money order cannot be redeemed after a certain date or time. Another condition option could require that certain sale-related criteria be met. As an example, a money order requester may want to use a virtual money order as payment for a purchased item or service. In the case of an item ordered by the requester "sight unseen", the requester might require that redemption be prevented until proof of shipment is provided to the trusted third party by the seller. In a particular example, the requester might require that the ordered item be shipped to the trusted third party for scrutiny and money order redemption allowed only upon verification that the item meets specified criteria.

Other conditions could specify that the virtual money order would become redeemable only upon provable completion of specified actions by the payee. For example, the virtual money order could be identified as a gift redeemable by a young payee upon graduation or upon receiving a driver's license. In such cases, the trusted third party might require the payee to provide a document as proof of completion before allowing the money order to be redeemed.

In all cases where redemption conditions are specified, the nature of such conditions may be included in the virtual money order notification sent to the money order payee.

In some embodiments, the money order purchaser may be offered the opportunity to rescind the virtual money order if certain conditions are met. For example, if the virtual money order is not redeemed within a certain time period after notification of the payee, the trusted third party processing system may send a notification to the money order requester and ask if the requester would like to have the money order withdrawn. If the requester does so, the processing system could remove access via the network address and process a return of some or all of the money order payment amount to the requester.

Figure 2:
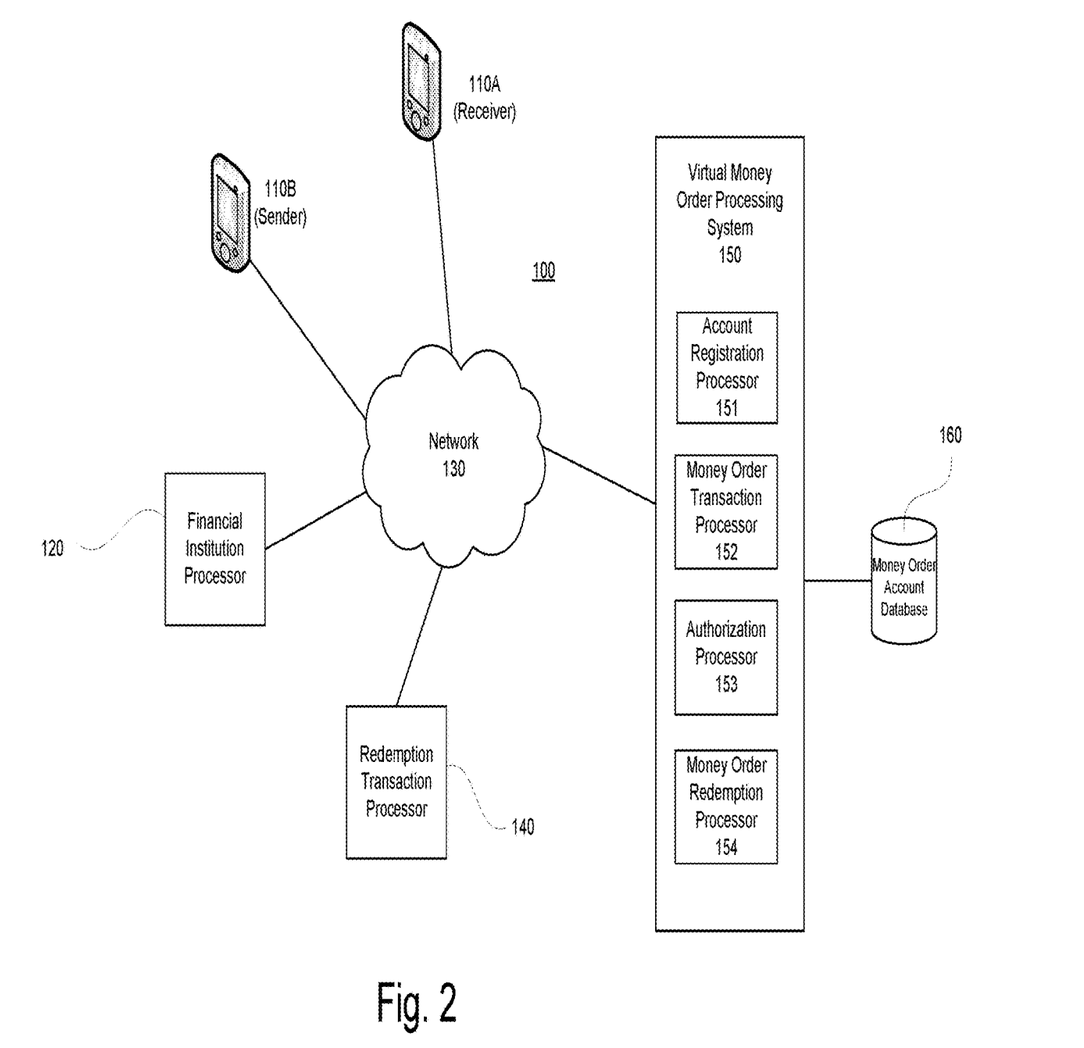
FIG. 2 is a schematic representation of a virtual money order transaction processing system according to an embodiment of the invention.

The methods of the invention can be implemented on or in conjunction with a virtual money order transaction system that encompasses network enabled devices of users and potential users, financial institutions, merchants, and transaction facilitators. FIG. 2 depicts an exemplary virtual money order transaction system 100 according to an embodiment of the invention. The transaction system 100 may include various network-enabled computer systems, including, as depicted in FIG. 2, a plurality of system user devices (sometimes referred to as user interface devices) 110, one or more financial institution processors 120, one or more redemption transaction processors 140, and a virtual money order processing system 150. All of these systems may be or comprise network-enabled processors and any or all may be capable of communication with one another via network 130. In some embodiments, some components of the transaction system 100 may communicate with one another via a second network in addition to or instead of the network 130.

As referred to herein, a network-enabled processor, computer system or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated by the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated transaction system 100 may have only a single instance of certain components, multiple instances of these components may be used. The transaction system 100 may also include other devices not depicted in FIG. 1.

The network 130 may be any form of communication network capable of enabling communication between the transaction entities and the virtual money order transaction system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

The virtual money order processing system 150 is an automated data processing system configured for selective communication with the user devices 110, financial institution processor(s) 120, and redemption transaction processor(s) 140 via the network 130. The system 150 will typically be managed by a financial institution or other service provider offering a virtual money order product. The system 150 includes one or more processors configured and programmed to process money order account registrations and virtual money order transactions. In the exemplary system illustrated in FIG. 2, the processing system 150 includes an account registration processor 151, a money order transaction processor 152, an authorization processor 153, and a money order redemption processor 154. Each of these components may communicate with each other component and with a money order account database 160.

The account registration data processor 151 is configured to receive money order account registration information for a system user and use that information to create an account record for that system user. The registration data processor 151 may be a network enabled processor arranged and configured to communicate with the user devices 110 via the network 130. The account registration processor 151 may be, in some embodiments, configured to receive an account registration request from a first system user via a first system user device 110A. The account registration request may be part of or the initiation of an interactive communication session between the first system user device 110A and the registration data processor 151. The account registration request may include information sufficient to identify the first system user and to verify the first user's identity in later communications. The registration data processor 151 may use the information from the request to create the account record, which may be stored in the money order account database 160. The processor 151 may be configured to assign an account identifier for association with the account record. In some embodiments, the registration processor 151 may associate an account-unique public key and an account-unique private key with the account identifier and the first system user information. In some embodiments, the public and private key may be or be associated with login information that may be used to establish future communication sessions with the processing system 150. In some embodiments, the account registration processor 151 may be configured to request additional information from the system user for use in determining user preferences and/or permissions. In particular embodiments, the registration processor 151 may be configured to associate user preferences and transaction conditions with the account record.

The money order transaction data processor 152 is configured to receive and process virtual money order requests from system users. The transaction data processor 152 may be a network enabled processor arranged and configured to communicate with the user devices 110 via the network 130. The transaction data processor 152 may be, particular, arranged and configured to receive a virtual money order purchase request from a second system user via a second system user device 110B. In some embodiments, the purchase request may be or may be the initiation of an interactive session between the transaction data processor 152 and the second system user device 110B. The purchase request may include identification of the first user as a virtual money order payee, a money order amount, and payment information for second system user. The transaction processor 152 may be configured to verify that the identified payee is a money order account holder. In some embodiments, the purchase request may include specification of conditions for the redemption of the virtual money order. The virtual money order transaction processor 152 may be configured to determine if the second user is authorized to specify such conditions and, if so, associate these conditions with the virtual money order transaction.

The money order transaction data processor 152 may be configured to determine a payment amount required from the second system user in order for the requested virtual money order to be processed. This amount may be, for example, the requested money order amount plus any fee or fees assessed by the entity offering the virtual money order product. The transaction processor 152 may transmit a notification of the payment amount to second user device 110B and request the second system user to verify that they want to proceed. The transaction processor 152 may be further configured to use the second user payment information to process a transfer of the payment amount from a financial institution account of the second user. This could include, for example a transfer of the payment amount by the financial institution processor 120 to the virtual money order processor 150 (or other system of the transaction managing entity) for deposition into a transaction processor account. The virtual money order transaction processor 152 may then generate the requested virtual money order in the form of a record having virtual money order information identifying the value of the money order, identification of the second system user as the requester, identification of the first system user as the payee (e.g., by money order account number), and any additional authentication requirements or other conditions for redemption. The virtual money order transaction processor 152 may be further configured to generate unique graphical indicia or other unique information for inclusion in the virtual money order record. The transaction processor 152 may store the virtual money order record in the money order account data base 160, a separate virtual money order database (not shown), or other data storage unit.

The virtual money order transaction processor 152 may be further configured to make some or all of the virtual money order information accessible via a network address on a particular communication network, which may be, may be part of, or may be accessible through the network 130 so that it is accessible by the first user device 110A. The transaction processor 152 may be further configured to transmit to the first user device 110A a notification regarding the virtual money order, the notification including some of the money order information in the virtual money order record. Such information would typically include the amount of the money order, identification of the requester/purchaser of the money order, and the network address where the virtual money order may be accessed. Other information could include any conditions or limitations on money order redemption.

The virtual money order transaction processor 152 receive from the first user device 110A at the network address, a request to view or otherwise receive information for the virtual money order that will allow the first user to redeem the virtual money order. This request may include identification and/or other authorization information that can be used to verify authorization of the information requester. This information may include, for example, the public and private keys for the first system user's virtual money order account. The transaction processor 152 may be configured to pass the authorization information to the authorization data processor 153 for authorization verification. The authorization data processor 153 may be configured to receive the authorization information and use it to verify that the information requester (the first system user) is authorized to receive the virtual money order information. This may be accomplished by comparing the authorization information to information associated with the first user's money order account information stored in the money order account database 160 to assure that all authorization criteria are met. If all criteria are met, the authorization data processor 153 may transmit, or instruct the virtual money order transaction processor 152 to transmit, some or all of the virtual money order information to the first user device 110A via the network 130. In some embodiments, the information transmitted would include information unique to the virtual money order that would need to be presented for the virtual money order to be redeemed. This unique information could be or include unique graphical indicia such as a QR code.

The money order redemption data processor 154 is configured to receive virtual money order redemption requests from the redemption transaction processor(s) 140. A redemption request is transmitted by the redemption processor 140 upon presentation of virtual money order information for redemption by a purported virtual money order payee. The redemption request would include at least a portion of the money order information obtained by the first system user 110A by accessing the network address. In embodiments where the information included a unique code or other indicia, the redemption request would include some or all of such unique information. The redemption request may also include other authentication or other information as required by the money order purchaser. The money order redemption data processor 154 may be configured to verify, using the redemption request information that all conditions for redemption have been met. This may include verification that the money order-unique information (e.g., QR code or other indicia) matches the unique information associated with the virtual money order record. The money order redemption data processor 154 may be further configured to verify identification and/or authorization information of the redemption requester or obtain verification and/or authorization from the authorization data processor 153.

The money order redemption data processor 154 may be further configured to, upon verification that all redemption criteria have been met, transmit an instruction to the redemption processor 140 to redeem the virtual money order. The redemption data processor 154 may then process a transfer of the money order amount from the transaction processor account to the entity managing the redemption processor 140.

The redemption processor 140 may be any system usable by a virtual money order redeeming entity to receive information from a prospective virtual money order redeemer. In some embodiments, the redemption processor 140 may be configured to receive redeemer information via a data entry interface which may include, without limitation, a keyboard, a touch-screen, an audio translator, a scanner, a biometric scanner, and a video camera. The redemption processor 140 may also be configured to communicate with the first user device 110A via near field communication (NFC) or other form of wireless or wired communication. In particular embodiments, the redemption processor 140 may include a scanning device positioned and configured to scan a display of the user device 110A to allow the redemption processor 140 to read a displayed QR code or other unique graphical indicia. The redemption processor 140 may be further configured to dispense cash to the first system user upon successful redemption of the virtual money order or to process a deposit into an account of the first system user.

Figure 3:
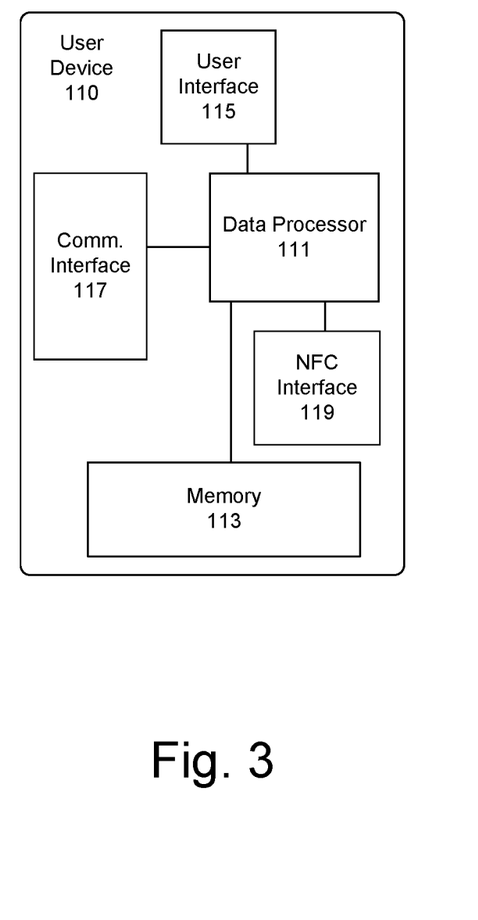
FIG. 3 is a schematic representation of a user processing device usable in embodiments of the invention.

With reference to FIGS. 2 and 3, a user device 110 may be any data processing and/or communication device that a system user uses to carry out transactions and/or to receive notifications from the virtual money order processing system 150. In particular embodiments, the user device 110 is a mobile interface device such as a smartphone or tablet. The system user device 110 includes an on-board data processor 111 in communication with a memory module 113, a user interface 115, and a communication interface 117. In some embodiments, the user device 110 may also include an NFC interface 119. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 115 includes a user input mechanism, which can be any device for entering information and instructions into the system user device 110, such as a touch-screen, keyboard, mouse, cursor-control device, microphone, stylus, or digital camera. The user interface 115 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 117 is configured to establish and support wired or wireless data communication capability for connecting the device 110 to the network 130 or other communication network. The communication interface 117 can also be configured to support communication with a short-range wireless communication interface via, for example, Bluetooth®.

The NFC interface 119 is in data communication with the data processor 111 and is configured for establishing near field communication with an NFC device. The NFC device may be any device that is or includes an NFC transmitter, receiver or both. In many cases, the NFC device may be or comprise an radio-frequency identification (RFID) transmitter. Such a device may be active or passive and may be in communication with other RFID-capable devices in the transaction system 100. NFC tags, RFID stickers, and NXP MIFARE stickers, as well as interface points for different frequency readers (e.g., readers attuned to non-traditional contactless interface point tunings), non IoT devices, and contactless interface points designed for different technologies (e.g., sonic readers or X-ray readers) may be used within system 100.

In particular embodiments of the invention, the NFC device may be a redemption transaction processor 140 having its own NFC interface.

The user device 110 may receive and read NFC transmissions via the NFC interface 119 from the various types of NFC devices in similar manner as discussed herein, or as modified in a manner understood by one of ordinary skill in light of the present disclosure. The user device 110 may utilize the information gathered from the various NFC devices, for example, as "location-based IDs," as triggers to perform a function, or to contact a database for more information.

In various embodiments of the invention, the memory 113 may have stored therein one or more applications usable by the data processor 111 to conduct and/or monitor transactions associated with a particular account. Such transactions may be between an account holder's user device 110 and a merchant device or other device over the network 130. These account applications may include instructions usable by the data processor 111 to identify transaction events, store event data in the memory 113, and communicate event data. Some applications may also include instructions relating to receiving and interpreting notifications and/or instructions from the virtual money order processing system 150. Account-related applications may also include instructions relating to user or device authentication and/or transmission of authentication information to an authentication server.

In particular embodiments, the memory 113 may have stored therein a virtual money order application that can be used to for requesting a new virtual money order transaction or for redeeming a virtual money order. This application may include instructions for causing the user device 110 to prompt for and receive, via the user interface 115 virtual money order request information, account or identity information, authorization information, payment information, and/or money order redemption conditions. The virtual money order application may include instructions for the data processor 111 to assemble and transmit a virtual money order request to the money order transaction processor 152. It may also include instructions for receiving from the virtual money order processing system 150 and selectively displaying on a display of the user interface 115 unique information (e.g., unique graphical indicia such as a QR code) associated with a virtual money order.

The present invention provides a significant improvement in security and control of person-to-person monetary transfers. The virtual money order processing methods of the invention provide the transferor the opportunity to set authorization and other conditions for completion of the transfer. The methods of the invention also provide advantages to the transferee in the form of improved speed and immediate availability of the transferred funds.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method of processing a virtual money order transaction between a first user having a first user device and a second user having a second user device, the method comprising:

receiving, by a money order transaction data processor from the second user device, a virtual money order purchase request, the request including identification of the first user as a virtual money order payee, a money order amount, and second user payment information;

transferring, by the money order transaction data processor, a payment amount from an account of the second user to a transaction processor account, the payment amount being equal to or greater than the money order amount;

generating, by the money order transaction data processor, a virtual money order having associated virtual money order information accessible over a network via a network address specific to the virtual money order;

transmitting, to the first user device, a money order notification including the network address;

receiving, by the money order transaction data processor from the first user device via the network address, a request to receive the virtual money order information;

transmitting, the virtual money order information to the first user device.

2. A method according to claim 1 wherein the request to receive the virtual money order information includes at least one form of user-specific identification that is unique to the first user and that is associated with the first user money order account.

3. A method according to claim 1 further comprising:
assigning, by the account registration data processor, a first unique public key and a first unique private key to the first money order account; and
verifying, by an authorization data processor using at least one of the first unique public key and the first unique private key, that the first user is authorized to receive the virtual money order information,
wherein the action of transmitting the virtual money order information is carried out only upon positive verification that the first user is authorized to receive the virtual money order information.

4. A method according to claim 3 wherein:
the request to receive the virtual money order information includes a request public key and a request private key, and
the action of verifying that the first user is authorized includes verifying that the request public key and the request private key match the first unique public key and first unique private key.

5. A method according to claim 1 wherein the virtual money information comprises graphic indicia unique to the virtual money order.

6. A method according to claim 5 further comprising:
receiving, by a money order redemption data processor, a request from a redemption requester to redeem the virtual money order;
determining whether the request includes the unique graphic indicia; and
responsive to a determination that the request includes the unique graphic indicia, transferring, by the money order redemption data processor, the money order amount from the transaction data account to the redemption requester.

7. A method according to claim 6 wherein the unique graphic indicia is or includes a quick response (QR) code.

8. A method according to claim 6 wherein
the request to redeem is received from a transaction processor of a financial institution and
the action of transferring the money order amount includes transmitting an instruction to the transaction processor to immediately release cash in the money order amount to the redemption requester.

9. A method according to claim 6 wherein
the request to redeem is received from a transaction processor of a financial institution with which the first user has a first user financial account and
the action of transferring the money order amount from the transaction processor account to the first user includes transferring the money order amount from the transaction processor account into the first user financial account for immediate availability to the first user.

10. A method according to claim 1 wherein the payment amount is equal to a sum of the money order amount and a processing fee.

11. An automated virtual money order processing system comprising:
a money order transaction data processor configured to
receive, from a purchaser user device via a first network, a virtual money order purchase request of a purchaser, the purchase request including identification of a virtual money order payee, a money order amount, and purchaser payment information, the virtual money order payee being associated with a payee user device,
process, using the purchaser payment information, a payment transaction to transfer a payment amount from an account of the purchaser to a transaction processor account, the payment amount being equal to or greater than the money order amount,
generate a virtual money order having associated virtual money order information accessible via a network address on a second network, which may be the same as the first network, the network address being specific to the virtual money order,
transmit, to the payee user device via the first network, a money order notification including the network address,
receive from the payee user device via the network address, a request to receive the virtual money order information, and
transmit the virtual money order information to the payee user device via the second network; and
a money order redemption data processor configured to
receive a request to redeem the virtual money order, the request including at least a portion of the money order information, and
process a transfer of the money order amount from the transaction processor account to the redemption requester.

12. A system according to claim 11 wherein the request to receive the virtual money order information includes payee authorization information and the method further comprises:
an authorization data processor configured to
receive the payee authorization information from the money order transaction data processor, and
verify, using the payee authorization information, that the payee is authorized to receive the virtual money order information,
wherein the action to transmit the virtual money order information by the money order transaction data processor is carried out only in response to a positive verification that the payee is authorized to receive the virtual money order information.

13. A system according to claim 12 wherein the account registration data processor is further configured to assign a first unique public key and a first unique private key to the first money order account.

14. A system according to claim 13 wherein:
the payee authorization information includes a request public key and a request private key, and the authorization data processor is configured to, as part of the action of verifying that the first user is authorized, verify that the request public key and the request private key match the first unique public key and first unique private key.

15. A system according to claim 11 wherein:
the money order transaction data processor is further configured to generate unique graphic indicia for inclusion in the virtual money order information, the unique graphic indicia being required for redemption of the virtual money order, and
the money order redemption data processor is configured to condition the action to process the transfer of the money order amount on the at least a portion of the money order information including the unique graphic indicia.

16. A system according to claim 15 wherein the unique graphic indicia comprises a quick response (QR) code.

17. A system according to claim 11 wherein
the request to redeem is received from a transaction processor of a financial institution via a third network, which may be the same as either or both the first network and the second network, and
the money order redemption data processor is configured to, as part of the action to process the transfer of the money order amount, transmit, via the third network, an instruction to the financial transaction processor to immediately release cash in the money order amount to the redemption requester.

18. A system according to claim 11 wherein
the request to redeem is received from a transaction processor of a financial institution with which the payee has a payee financial account via a third network, which may be the same as either or both the first network and the second network, and
the money order redemption data processor is configured to, as part of the action to process the transfer of the money order amount, transfer the money order amount from the transaction processor account into the payee financial account for immediate availability to the payee.

19. A virtual money order transaction system comprising:
a plurality of user interface devices, each user interface device being associated with a user and being configured for communication over a network, the plurality of user interface devices including a purchaser user device associated with a money order purchaser and a payee user device associated with a money order payee;
a virtual money order data processing system in communication with the network and including
a money order transaction data processor configured to
receive, from the purchaser user device via the network, a virtual money order purchase request, the purchase request including identification of the money order payee, a money order amount, and purchaser payment information,
generate a virtual money order accessible via a network address on the network, the network address being specific to the virtual money order and the virtual money order including unique redemption indicia,
transmit, to the payee user device via the first network, a money order notification including the network address,
receive from the payee user device via the network address, a request to view the virtual money order, and
allow access to the virtual money order by the payee user device, and
a money order redemption data processor configured to
receive a request to redeem the virtual money order, the request including purported redemption indicia, and
responsive to a determination that the purported redemption indicia matches the unique redemption indicia of the virtual money order, transmit an instruction to redeem the virtual money order; and
a transaction processor of a financial institution, the transaction processor being in communication with the network and configured to
receive, from the payee user device, the request to redeem the virtual money order,
transmit, to the money order redemption data processor, the request to redeem the virtual money order,
responsive to receiving the instruction to redeem the virtual money order from the order redemption data processor, transfer cash in the virtual money order amount to the payee.

20. A system according to claim 19 wherein the request to receive the virtual money order information includes payee authorization information and the virtual money order data processing system further comprises:
an authorization data processor configured to
receive the payee authorization information from the money order transaction data processor, and
verify, using the payee authorization information, that the payee is authorized to receive the virtual money order information,
wherein the action to allow access to the virtual money order by the money order transaction data processor is carried out only in response to a positive verification that the payee is authorized to receive the virtual money order information.

* * * * *